(12) United States Patent
Paschke et al.

(10) Patent No.: US 11,990,054 B2
(45) Date of Patent: May 21, 2024

(54) DENTAL TRAINING DEVICES, SYSTEMS, AND METHODS

(71) Applicant: Paschke Ultrasonix LLC, Missoula, MT (US)

(72) Inventors: Richard H. Paschke, Missoula, MT (US); Marianne Dryer, Plymouth, MA (US); Noel S. Paschke, Missoula, MT (US)

(73) Assignee: PASCHKE ULTRASONIX LLC, Missoula, MT (US)

( * ) Notice: Subject to any disclaimer, the term of this patent is extended or adjusted under 35 U.S.C. 154(b) by 552 days.

(21) Appl. No.: 17/378,047

(22) Filed: Jul. 16, 2021

(65) Prior Publication Data

US 2022/0020291 A1 Jan. 20, 2022

Related U.S. Application Data

(60) Provisional application No. 63/052,539, filed on Jul. 16, 2020.

(51) Int. Cl.
*G09B 23/28* (2006.01)
*A61C 19/04* (2006.01)

(52) U.S. Cl.
CPC ............ *G09B 23/283* (2013.01); *A61C 19/04* (2013.01)

(58) Field of Classification Search
CPC ........ G09B 23/283; G09B 19/24; A61C 19/04
See application file for complete search history.

(56) References Cited

U.S. PATENT DOCUMENTS

| 2016/0086514 A1* | 3/2016 | Washburn ............... G09B 19/24 434/219 |
| 2019/0096285 A1* | 3/2019 | Bode .................... G09B 23/283 |
| 2019/0221136 A1* | 7/2019 | Washburn ............... G09B 19/24 |

FOREIGN PATENT DOCUMENTS

| DE | 827998 C | 1/1952 |
| DE | 4119311 A1 | 12/1991 |
| JP | 2008033603 A | 2/2008 |

OTHER PUBLICATIONS

International Search Report and Written Opinion issued in corresponding International Application No. PCT/US2021/041993 dated Nov. 8, 2021, 22 pages.

(Continued)

*Primary Examiner* — Jeffrey S Vanderveen
(74) *Attorney, Agent, or Firm* — Carter, DeLuca & Farrell LLP

(57) ABSTRACT

A training system includes a tool connected to a control module. The tool includes a tip and a grip having two or more force sensing transducers configured to enable determination of sensor force measurement data. The control module receives the sensor force measurement data. The control module includes a storage device configured to store zeroed force data, and a data processing unit including a processor and memory storing instructions that, when executed by the processor, cause the processor to obtain the sensor force measurement data and the zeroed force data; determine, based upon the sensor force measurement data and the zeroed force data, a load force magnitude that is independent of grasp forces; determine whether the load force is within a set range; and, provide a corresponding indication where the load force is within the set range and/or where the load force is outside of the set range.

25 Claims, 9 Drawing Sheets

(56) References Cited

OTHER PUBLICATIONS

Canadian Office Action issued in corresponding Canadian Application No. 3,186,070 dated May 5, 2023, 4 pages.
Dong et al., "The Effects of Finger Rest Positions on Hand Muscle Load and Pinch Force in Simulated Dental Hygiene Work", Journal of Dental Education, Apr. 2005, pp. 453-460.
Wang et al., "Gripping Force Sensory Feedback for a Myoelectrically Controlled Forearm Prosthesis", Dept. of Precision Instruments, Tsinghua University, Beijing, P.R. China 100084 and School of Engineering Science, Simon Fraser University, Burnaby, BC V5A 1S6, Canada, pp. 501-504.
International Preliminary Report on Patentability and Written Opinion issued in corresponding International Application No. PCT/US2021/041993 dated Jan. 26, 2023, 17 pages.
Japanese Office Action issued in corresponding Japanese Application No. 2023-50289 dated Jul. 4, 2023, 8 pages.

\* cited by examiner

DENTAL TRAINING DEVICES, SYSTEMS, AND METHODS

CROSS-REFERENCE TO RELATED APPLICATIONS

This application claims the benefit of, and priority to, U.S. Provisional Patent Application No. 63/052,539, filed on Jul. 17, 2020, the entire contents of which are hereby incorporated herein by reference.

BACKGROUND

Technical Field

The present disclosure relates to dental devices, systems, and methods for training and calibration. More specifically, the present disclosure relates to dental instrument training devices, system, and methods providing visual and/or audible feedback based on, for example, lateral and apical pressure of an instrument tip, including load devices configured to communicate with a control module, a computer, and/or other devices.

Background of Related Art

The learning environment for preclinical instrumentation skills is changing from a live in-person to a remote virtual environment. However, devices that help the faculty or students facilitate this transition are presently lacking. For example, excess pressure can cause damage to the tooth structure, gum tissue, and/or cause damage to the clinician's hands and wrists inducing carpel tunnel issues. Inadequate instrumentation mastery could result in a clinician being "heavy-handed" causing pain to patients.

Faculty use subjective measures to evaluate students mastering grip pressure and pressure against the tooth. These two components are the essence of all clinical procedures. There is currently no objective measurement for evaluating students grasp in relationship to pressure against tooth/tissue, adaptation or angulation. Additionally, there is no objective way to document the changes over time in mastery or for remediation. For example, some faculty would describe in words the amount of pressure using analogies, such as "like a feather;" while others would gain permission to touch a student to show them the pressure. Both of these methods are flawed.

Furthermore, faculty are currently not calibrated regarding grasp in relationship to pressure and in an objective and measurable way due to the lack of a quantifiable way to demonstrate calibration, a part of Standard 3-6 within the Commission on Dental Accreditation (CODA) standards.

The use of pressure transducers for sensory feedback, is described by Wang, et. al in Gripping Sensory Feedback for a Myoelectrically Controlled Forearm Prostheses, 0-7803-2559-1/95 © 1995 IEEE. The article describes a method to vary the frequency of A Voltage Controlled Oscillator (VCO) by the varying pressure applied to a transducer. The application was able to distinguish the approximate magnitude of the gripping force.

U.S. Patent Application Publication No. 2019/0221136 describes the inclusion of pressure sensing membrane(s) (transducers) on the grip portion of a device that allows the technology to measure finger or grip position, strength or tension. However, this application does not contemplate making or recording the measurements of the transducers or any combination of measurements. Further, this application does not consider the relationship of the forces applied at the tip of an instrument or tool and the output response of the sensors on the grip or handle of the instrument induced by the applied forces. Rather, this application is limited to a sensor or a series or sensors mounted in the grip portion of a device.

H. Dong, et. al describe the importance of finger rest positions in the April 2005 issue of the Journal of Dental Education, The Effects of Finger Rest Positions on Hand Muscle Load and Pinch Force in Simulated Dental Hygiene Work. Here, testing was limited to mounting membrane sensors onto dental instruments and reading sensor output values, wherein the outputs were displayed in Newtons. One of the relevant features of the study was the relationship between pinch force and finger rests. Although a tripod grasp was taught to the study participants, no visual marking on the instrument were described or implemented.

SUMMARY

The terms "transducers" (plural) or "transducer" (singular) shall encompass multiple transducer configurations, single transducer configurations, and single substrate with multiple transducer configurations. Likewise, the terms "sensor" and "transducer" are utilized interchangeably hereinbelow; however, it is understood that any other suitable force and/or pressure sensors, in addition to or as an alternative to transducers are also contemplated. For example and without limitation, piezoelectric transducers, capacitive sensors, stain gauges, and the like are all contemplated for use in accordance with the present disclosure.

Lateral or apical pressures based on grip pressure may be detected for the following applications:
  Diagnostics (2-20 grams)
    Primarily using apical pressure with small lateral pressure of a probe against a tooth
  Exploratory Strokes (2-20 grams)
    Exploring stroke on a root surface with an explorer using primarily lateral pressure
    Ultrasonic instrument activation stroke for biofilm disruption using primarily lateral pressure
  Hand Instrumentation Activation Stroke (90-150 grams)
    Hand instrument stroke using an activation stroke using primarily lateral pressure
  Ultrasonic Instrumentation Activation Stroke (12-30 grams)
    Ultrasonic instrument activation stroke for light stain and calculus removal using primarily lateral pressure In accordance with the present disclosure, outputs of an array of sensors permanently mounted or removably mounted on a grip portion of a dental device are processed to provide visual and/or audible feedback relating to a proper grasp of the device, a quantifiable force applied to a load, and/or other feedback such as detailed hereinbelow. The present disclosure thus provides dental devices, systems, and methods for training and calibration, for use at both the faculty and student level, and which overcome the above-noted limitations of the prior art.

Provided in accordance with the above and other aspects of the present disclosure is a training system including a tool and a control module. The tool includes a tip portion and grip portion having at least two force sensing transducers configured to measure force applied thereto to enable determination of sensor force measurement data. The control module is connected to the tool and configured to receive the sensor force measurement data. The control module includes a storage device configured to store zeroed force data, and a data processing unit including a processor and memory storing instructions to be executed by the processor to cause the processor to: obtain the sensor force measurement data and the zeroed force data; determine, based upon the sensor force measurement data and the zeroed force data, a load force that is independent of grasp force; determine whether the load force is within a set range; and, where the load force is within the set range and/or outside of the set range, provide a corresponding indication.

In an aspect of the present disclosure, the at least two force sensing transducers includes an array of three force sensing transducers A, B, and C. An angle $\alpha 1$ is defined between longitudinal centerlines of transducers A and C, and an angle $\alpha 2$ is defined between the longitudinal centerline of transducer A and a plane defined by the tip portion of the tool.

In another aspect of the present disclosure, $\alpha 1$ and $\alpha 2$ are each 120 degrees. Alternatively, $\alpha 1$ is 180 degrees and $\alpha 2$ is 90 degrees.

In still another aspect of the present disclosure, markings are located on the centerlines of transducers A and C to facilitate proper grasp placement on the tool.

In yet another aspect of the present disclosure, the indication is at least one of an audio indication or a visual indication.

In still yet another aspect of the present disclosure, the control module further includes at least one input configured to enable user-selection of a mode of use. In such aspects, the set range may be determined based upon the mode of use selected.

In another aspect of the present disclosure, determining the load force independent of the grasp force includes subtracting the zeroed force measurement data from the sensor force measurement data for at least one force sensing transducer of the force sensing transducers.

In yet aspect of the present disclosure, the processor of the control module is further caused to obtain, during a measurement, the zeroed force measurement data. In such aspects, a scale may be configured to receive the tip portion of the tool to enable determination of scale force measurement data by measuring a force applied to the scale by the tip portion of the tool. The scale force measurement data is stored in the storage device of the data processing unit for utilization during the measurement.

In still another aspect of the present disclosure, the processor is further caused to: determine, based upon the sensor force measurement data, whether the tool is properly grasped or improperly grasped; and provide an indication when at least one of: it is determined that the tool is properly grasped or it is determined that the tool is improperly grasped.

Another training system provided in accordance with aspects of the present disclosure includes a tool and a control module. The tool includes a tool including a tip portion and grip portion having at least two force sensing transducers configured to measure force applied thereto to enable determination of sensor force measurement data. The control module includes a scale configured to receive the tip portion of the tool and to measure a force applied to the scale by the tip portion of the tool to enable determination of scale force measurement data, at least one input device configured to enable user-selection of a mode of use, and a data processing unit including a processor and memory. The memory stores instructions that, when executed by the processor, cause the processor to: determine, based upon the scale force measurement data, calibration data; store the calibration data in a storage device; store, as mode data, the mode of use selected; obtain the sensor force measurement data; retrieve the calibration data; determine, based upon the sensor force measurement data and the calibration data, a load force that is independent of grasp force; retrieve the mode data; and determine whether the load force is acceptable or not acceptable utilizing criteria based on the mode data retrieved.

The force sensing transducers may be configured similarly as detailed above or in any other suitable manner. Markings, such as those detailed above or any other suitable markings, may also be provided.

In an aspect of the present disclosure, the processor is further caused to provide at least one of an audio indication or a visual indication in response to at least one of determining that the load force is acceptable or determining that the load force is not acceptable.

In another aspect of the present disclosure, the criteria includes an acceptable range determined based upon the mode data. For example, for diagnostic and exploratory modes, the range may be 2 to 20 grams-force; for hand instrumentation, the range may be from 90 to 150 grams-force; and/or for ultrasonic instrumentation, the range may be from 12 to 30 grams-force.

In yet another aspect of the present disclosure, determining the load force independent of the grasp force includes subtracting the calibration data from the sensor force measurement data for at least one force sensing transducer of the at least two force sensing transducers.

In still another aspect of the present disclosure, the processor is further caused to: determine, based upon the sensor force measurement data, whether the tool is properly grasped or improperly grasped; and provide an indication when at least one of: it is determined that the tool is properly grasped or it is determined that the tool is improperly grasped.

Still another training system provided in accordance with aspects of the present disclosure includes a tool, a scale, at least one input device, and a data processing unit. The tool includes a tip portion and grip portion having a plurality of force sensors configured to measure forces applied thereto and output first force data based upon the measured forces. The scale is configured to receive the tip portion of the tool and is configured to measure forces applied thereto and to output second force data based upon the measured forces. The at least one input device is configured to enable user-selection of a mode of use and to output mode data based upon the selected mode of use. The data processing unit includes a processor and memory storing instructions that, when executed by the processor, cause the processor to: receive the first force data, the second force data, and the mode data; determine, based upon the first and second force data, a load force that is independent of grasp force; and determine whether the load force is acceptable or not acceptable utilizing criteria based on the mode data.

In aspects, the training system may include any of the aspects and/or features of the other training systems detailed hereinabove or otherwise herein; and vice versa.

In aspects, the scale, the at least one input device, and/or the data processing unit may be separate components, two or more may be incorporated into a simulation system or other suitable training system, etc. Such may be integrated into a single component of the system, separate components of the system, or connectable to the system (to enable removal therefrom). In aspects, for example, the tool and/or the scale are connectable to the simulation or other suitable training system. As an example, and without limitation, any combination of the tools, scales, input devices, data processing units, control modules, portions thereof, etc. of the present disclosure may be integrated into or connectable to a simulation system for use therewith. A suitable simulation system for this purpose is described in Patent Application Publication No. US 2019/0096285 titled "Dental Simulation Machine" and filed as application Ser. No. 16/083,103 on Mar. 9, 2017, the entire contents of which are hereby incorporated herein by reference.

In instances where one or more components of the present disclosure are integrated into or connectable to such a simulation or other suitable system, it is understood that one or more processors, memories, storage devices, input/output devices, etc. of the system may also perform some or all of the tasks of the data processing units of the present disclosure. Likewise, where practicable, mechanical components and features may also be shared. That is, a partially-integrated system, a fully-integrated system, or a modular/connectable system may be provided, depending upon a particular purposes. Indeed, the components of the present disclosure may be distributed amongst one another and/or a simulation or other suitable system in any suitable manner to enable communication therebetween and use therewith. Thus, the various components of the present disclosure are not limited to specific physical arrangements of components together or separately, but may be employed in any suitable manner.

Further, to the extent consistent, any of the aspects described herein may be used in conjunction with any or all of the other aspects described herein and may be integrated without compromise of function into other devices and systems, including systems using Artificial Intelligence (AI), e.g., the above-referenced simulation system.

DETAILED DESCRIPTION

Figure 1A:
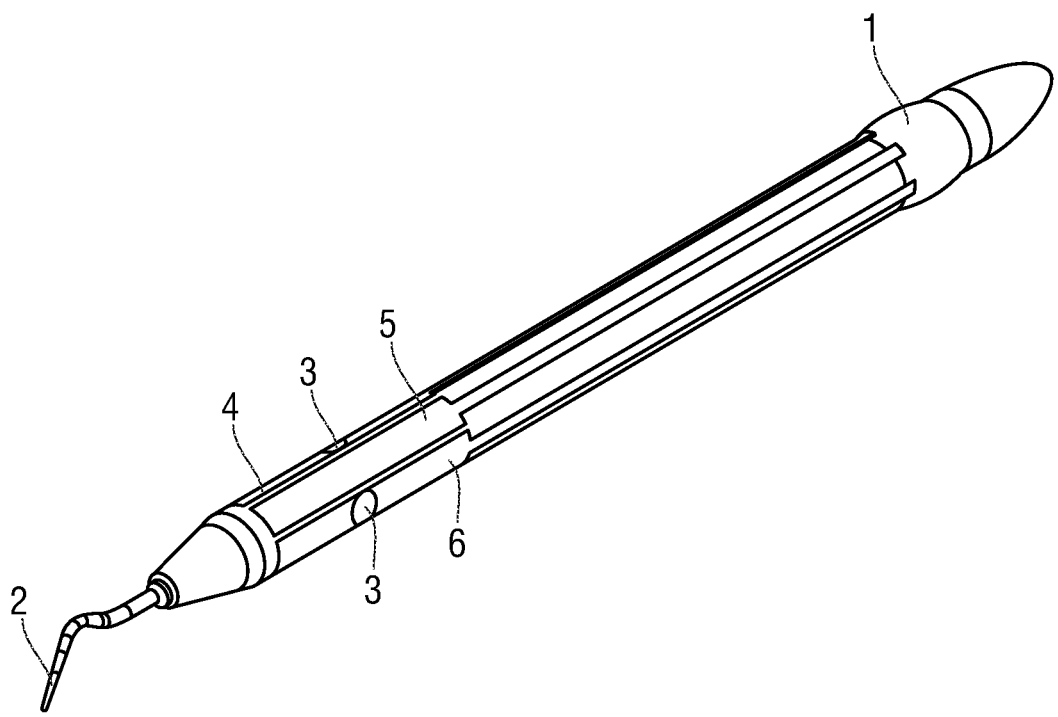
FIG. 1A shows a dental tool with pressure transducers (e.g., pressure sensors) disposed at a grip portion of the tool, including location markers for grasping the tool in accordance with the present disclosure.

Aspects and features of the present disclosure are described hereinbelow with reference to the accompanying drawings. In the following descriptions, well known functions or constructions are summarily described or omitted entirely to avoid obscuring the present disclosure in unnecessary detail. Further, although the aspects and features of the present disclosure are described herein, by way of example, with respect to handheld dental instruments, including hand scalers, explorers, and ultrasonic instruments, it is understood that the aspects and features of the present disclosure also apply equally to other handheld tools, whether referred to as tools, instrument, assemblies, etc.

FIG. 1 illustrates an exemplary dental hand instrument in accordance with the present disclosure including a tool 1 having a tip portion 2 and a grip portion, where in this example, the grip portion includes three discrete transducers 4, 5, and 6. One or more markers 3 are located on the centerline of (longitudinally centered along) sensors 4 and 6 to aide in the placement of the user's fingers (including thumb), e.g., the index finger, during use. The placement of the sensors 4, 5, 6 on a curved surface will produce a signal output independent of any grasp of the tool 1. This output will be compensated for during system pretest (see FIG. 3), as detailed below. The initial grasp using the thumb and index finger placement would produce finite force readings on sensors 4 and 6 and a zero reading on sensor 5. Any forces or pressures applied to the apical or lateral surfaces of a load structure, for example a tooth, are detected on the surface of the transducers and are communicated to the control module as detailed below with reference to, FIGS. 2A and 2B.

Figure 1B:
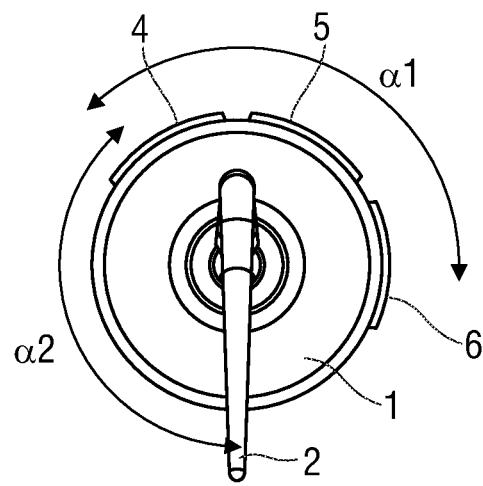
FIG. 1B is a front view of the tool of FIG. 1A showing the relative positioning of the sensors.

FIG. 1B shows a front view of the tool 1 where angle α1 describes the separation between transducers 4 and 6. Angle α2 describes the relative position of sensor 4 to the plane of the tip 2. In a non-limiting example, the relative widths of the transducers 4, 5, and 6 are the same. The sizes and positions of the transducers enable repeatable determination of apical and lateral forces applied by the tool 1 when loaded against a surface, for example the root of a tooth. These relative forces are measured by the individual sensors 4, 5, 6 and processed using a suitable algorithm(s), such as those detailed below with reference to FIGS. 5 and 6.

Figure 1C:
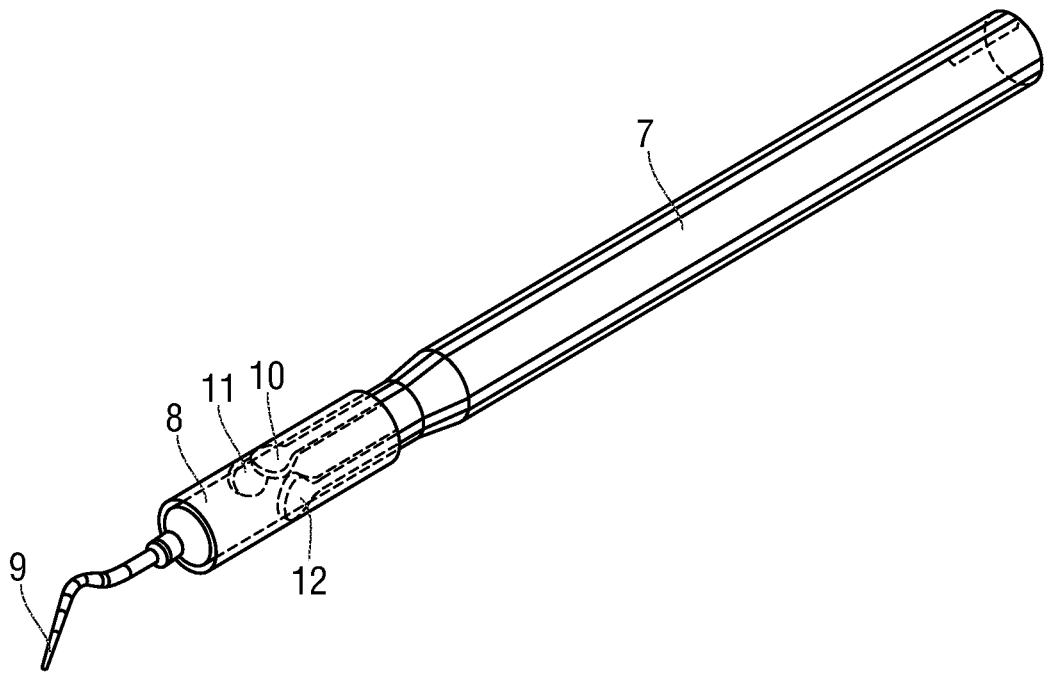
FIG. 1C shows a dental ultrasonic handpiece and tool with sensors located under a sheath.

Referring to FIG. 1C, a sheath 8 is shown covering an array of three sensors 10, 11, and 12, on an ultrasonic insert assembly 7 including a tip 9. It is anticipated that force concentrators (not shown) may be placed on the sensors 10, 11, 12 to compensate for the resilient characteristics of the material of sheath 8 and improve the response to forces applied to sensors 10, 11, and 12 during use. Both the placement of sensors 10, 11, and 12 on a curved surface and the additional pressure of sheath 8 will create an output that will be compensated for during system pretest 30, as detailed below with reference to FIG. 3. Similar grasp instruction using index finger and thumb placement on markers (not shown) apply. Any forces or pressures applied to the apical or lateral surfaces of a load structure, for example a tooth, are detected on the surface of the sensors 10, 11, 12 and are communicated to the control module (see FIGS. 2A and 2B).

Figure 1D:
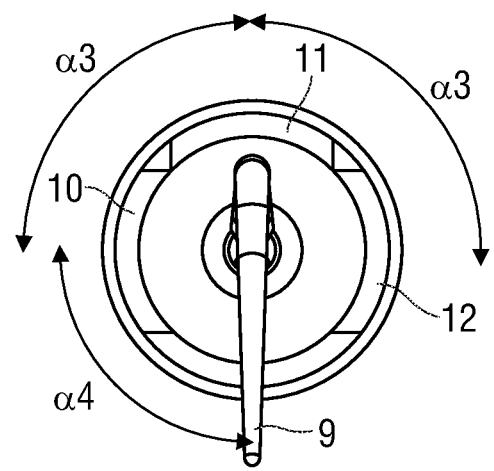
FIG. 1D is a front view of the dental ultrasonic handpiece and tool of FIG. 1C showing the relative position of the sensors in accordance with the present disclosure.

FIG. 1D represents a front view of insert assembly 7, showing the circumferential placement of the sensors, wherein, the spacing of the sensors 10, 11, and 12 is defined by angles α3, α3, respectively, and the relative position of sensor 10 to the plane of tip 9, is defined by angle α4. The surface area of the transducer is in part determined by the area where the grip is to be held. It is anticipated that the spacing of the sensors 10, 11, and 12 is different than the spacing on a hand instrument, for example, sensor angles α1 and α2 (see FIG. 1A). This is in part due to the requirement for the ultrasonic instrument to be rotated as the instrument tip is moved along the line angles of a tooth.

Figure 2A:
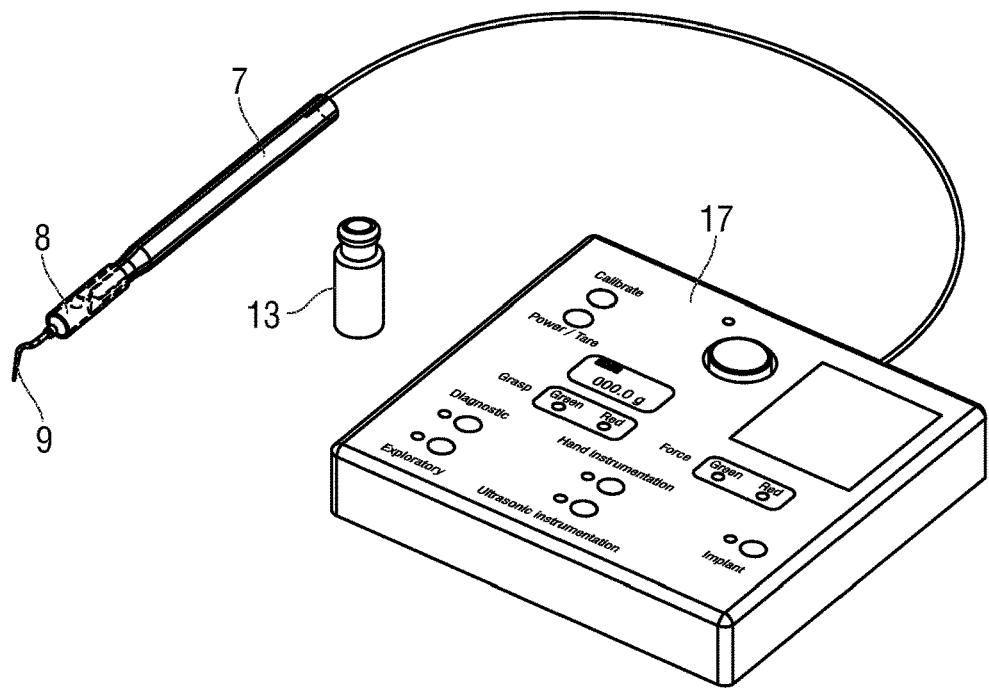
FIG. 2A is a perspective view of a control module with an attached dental tool having sensors.
Figure 2B:
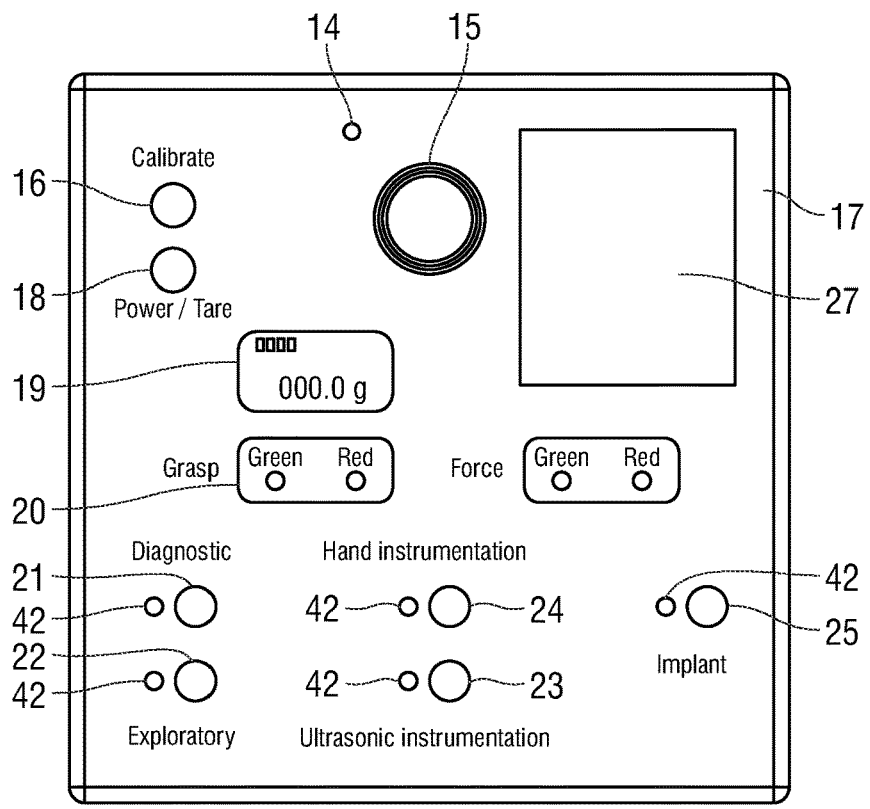
FIG. 2B is a front view of the control module of FIG. 2A showing the details of the control module controls including mode selection and visual indicators for providing status information of measurements.

In referring to FIG. 2A, ultrasonic instrument 7 is shown configured to communicate with a control box or module 17. A control weight 13 is included as a means to check the calibration of scale 15 (FIG. 2B). Control module 17 includes and/or is connected to a data processing unit including one or more processors to process data, one or more memories in communication with the processor to store data, and an input/output unit (I/O) to interface processor(s) and/or memory(s) to other modules, units, and/or devices. The processor(s) can include, for example, a central processing unit (CPU) or a microcontroller unit (MCU). The memory(s) can include and store processor-executable code, which when executed by the processor(s), configures the data processing unit to perform various operations, e.g., such as receiving information, commands, and/or data, processing information and data, and transmitting or providing information/data to another device. To support various functions of the data processing unit, the memory(s) can store information and data, such as instructions, software, values, images, and other data processed or referenced by processor(s). For example, various types of Random Access Memory (RAM) devices, Read Only Memory (ROM) devices, Flash Memory devices, and other suitable storage media can be used to implement storage functions of the memory(s). The I/O of the data processing unit can interface the data processing unit with other components via various types of wired or wireless interfaces compatible with typical data communication standards, for example, via a wireless transmitter/receiver (Tx/Rx), e.g., including, but not limited to, Bluetooth, Bluetooth low energy, Zigbee, IEEE 802.11, Wireless Local Area Network (WLAN), Wireless Personal Area Network (WPAN), Wireless Wide Area Network (WWAN), WiMAX, IEEE 802.16 (Worldwide Interoperability for Microwave Access (WiMAX)), 3G/4G/LTE cellular communication methods, NFC (Near Field Communication), and parallel interfaces. The I/O of the data processing unit can also interface with other external interfaces, sources of data storage, and/or visual or audio display devices, etc. to retrieve and transfer data and information that can be processed by the processor(s), stored in the memory(s), and/or exhibited on an output unit, e.g., various types of screen displays, speakers, or printing interfaces including but not limited to, light emitting diode (LED), or liquid crystal display (LCD) monitor or screen, cathode ray tube (CRT) as a visual display; audio signal transducer apparatuses as an audio display; and/or toner, liquid inkjet, solid ink, dye sublimation, inkless (e.g., such as thermal or UV) printing apparatuses, etc.

One or more storage devices may also be included within control box or module 17 or communicatively connected thereto for storing, for example, sensed and/or determined data. Such storage device(s) may include, for example, RAM, ROM, EEPROM, flash memory, etc., and may store such data in the form of look-up tables, data fields, or in any other suitable manner.

Referring to FIG. 2B, an example of control box or module 17 is shown which includes components 19, 20, and 26 for a visual response to the transducer communication. Components 19, 20, 26 may be display screens (for example, an LCD display, a common segment display, etc.) or other suitable indicators (for example, one or more LED's of similar or different colors). An audio alarm, not shown, is included within module 17, for providing audio alerts/feedback. Power on is provided by pressing and releasing (or otherwise manipulating) control 18. When power is applied to module 17, control 18 also provides a tare function, wherein the scale reading is set to zero when control 18 is pressed and released (or otherwise manipulated) when the system is powered on. The system can be turned off by pressing and holding control 18 for a period greater than 3 seconds. A gram scale 15 configured to receive the tip of an instrument during a training session is provided for indicating the gram force applied by the instrument tip and includes a readout 19. An area 27 provides the user with a stable fulcrum during measurement and programming (see, for example, FIG. 4). A calibrate control 16, functions to zero out the initial grasp forces, for example on transducers 4, 5, and 6 (FIG. 1A), wherein control 16 is pressed and released (or otherwise manipulated) (see also FIG. 3), whereupon the calibrate light 14 flashes three times and then reverts to a steady on lighted state. Other visual indications are also contemplated. The calibrate control 16 also provides a programming function whenever it is depressed and held for longer than 3 seconds (see FIG. 4) whereupon calibrate light 14, flashes three times and then reverts to a steady lighted state (see FIG. 4).

Figure 5:
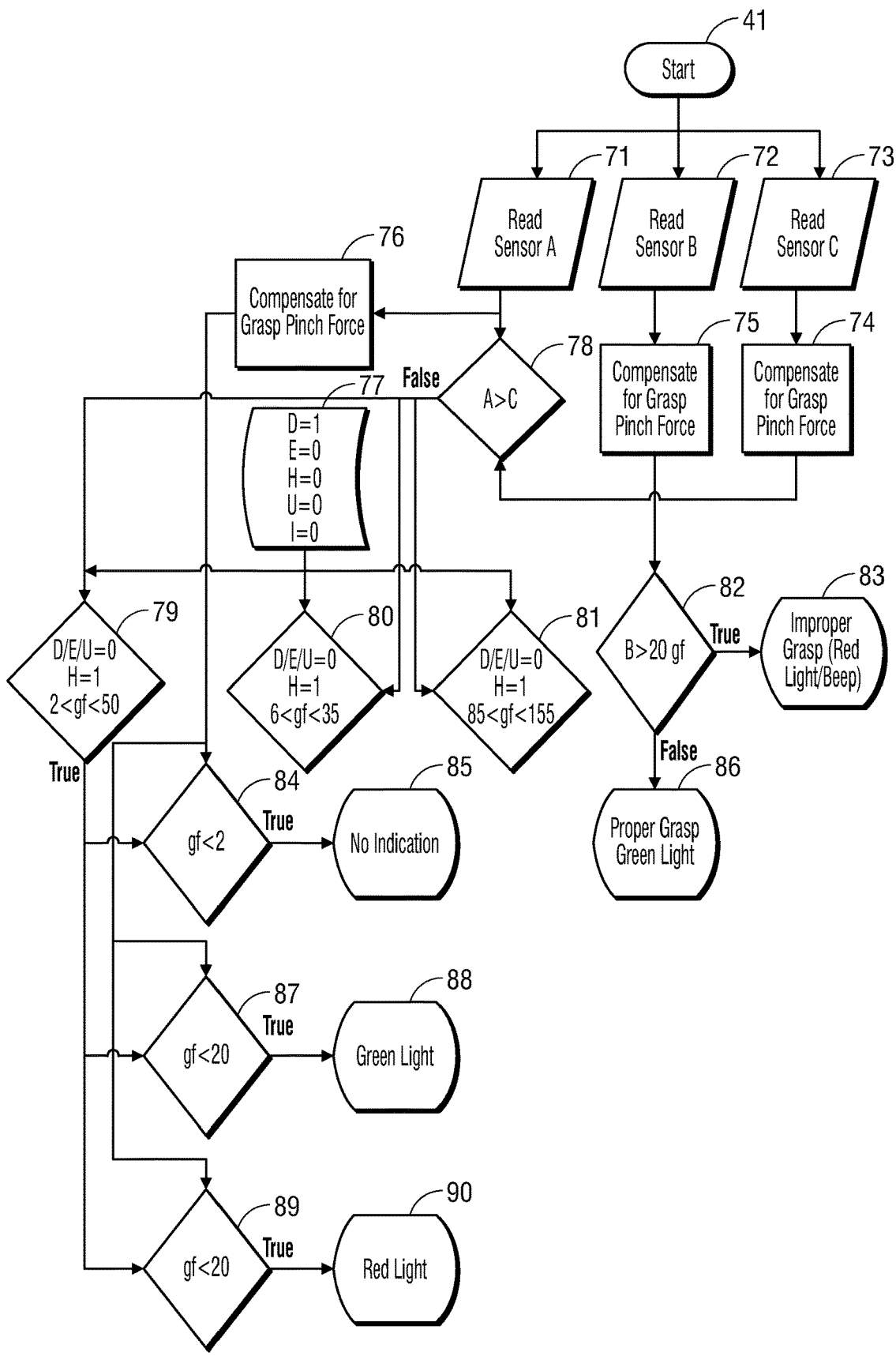
FIG. 5 is a flow diagram for a routine demonstrating a proper grasp of an instrument and measurements in a controlled range of forces for a diagnostic mode in accordance with the present disclosure.
Figure 6:
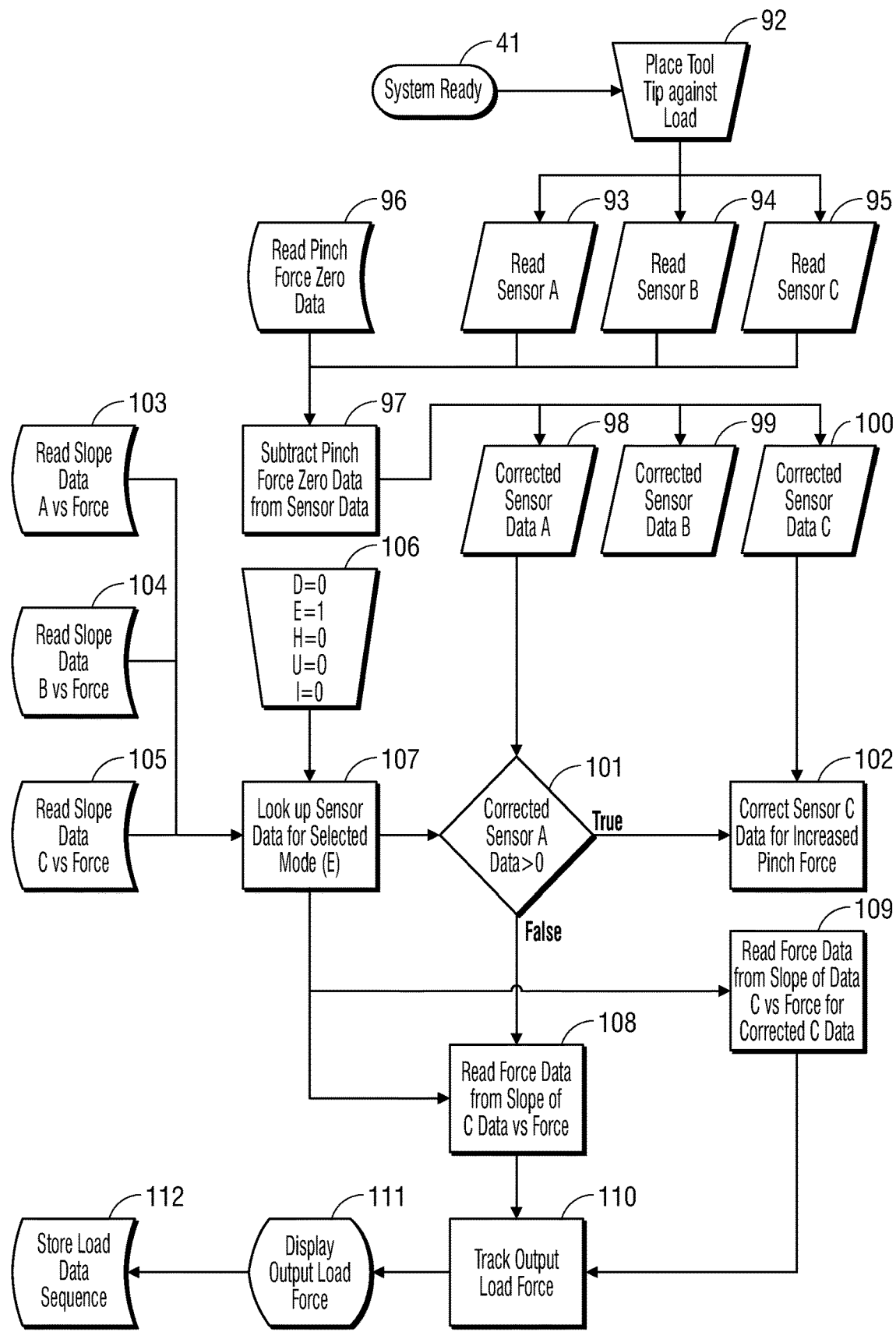
FIG. 6 is a flow diagram of a routine for displaying applied load forces with a correction process to address the bias of grasp pressure during measurement in accordance with the present disclosure.

With further reference to FIG. 2B, mode selection controls 21, 22, 23, 24, and 25 provide binary outputs used for example, in decision logic (see FIGS. 5 and 6). Whenever a mode, for example, Diagnostic, Exploratory, Hand Instrumentation, Ultrasonic Instrumentation, or Implant is selected by controls 21, 22, 23, 24, or 25, respectively, a light 42 adjacent to the control is lighted. With the exception of the Implant mode, the mode selections are mutually exclusive and only one can be active at a time. An additional function of the modes is to set the range for force indicator 26. These ranges are pre-defined by the mode, however, when the Implant mode 25 is selected, the ranges for all the modes will be modified according to the preset levels recommended for the instrumentation on implants. Multiple USB ports (not shown) for communication with a PC or printer are also provided, although other suitable ports including wired or wireless ports to enable communication with computers and/or peripheral devices are also contemplated. The user interface may include a series of LED's, a graphical user interface (GUI), or other suitable user interfaces. It is anticipated that some or all the functions, algorithms, and user interfaces can be integrated into another system wherein all controls and functions would be controlled by that system, or where controls and functions are integrated across separate systems (and/or in the cloud) as part of a network.

Figure 3:
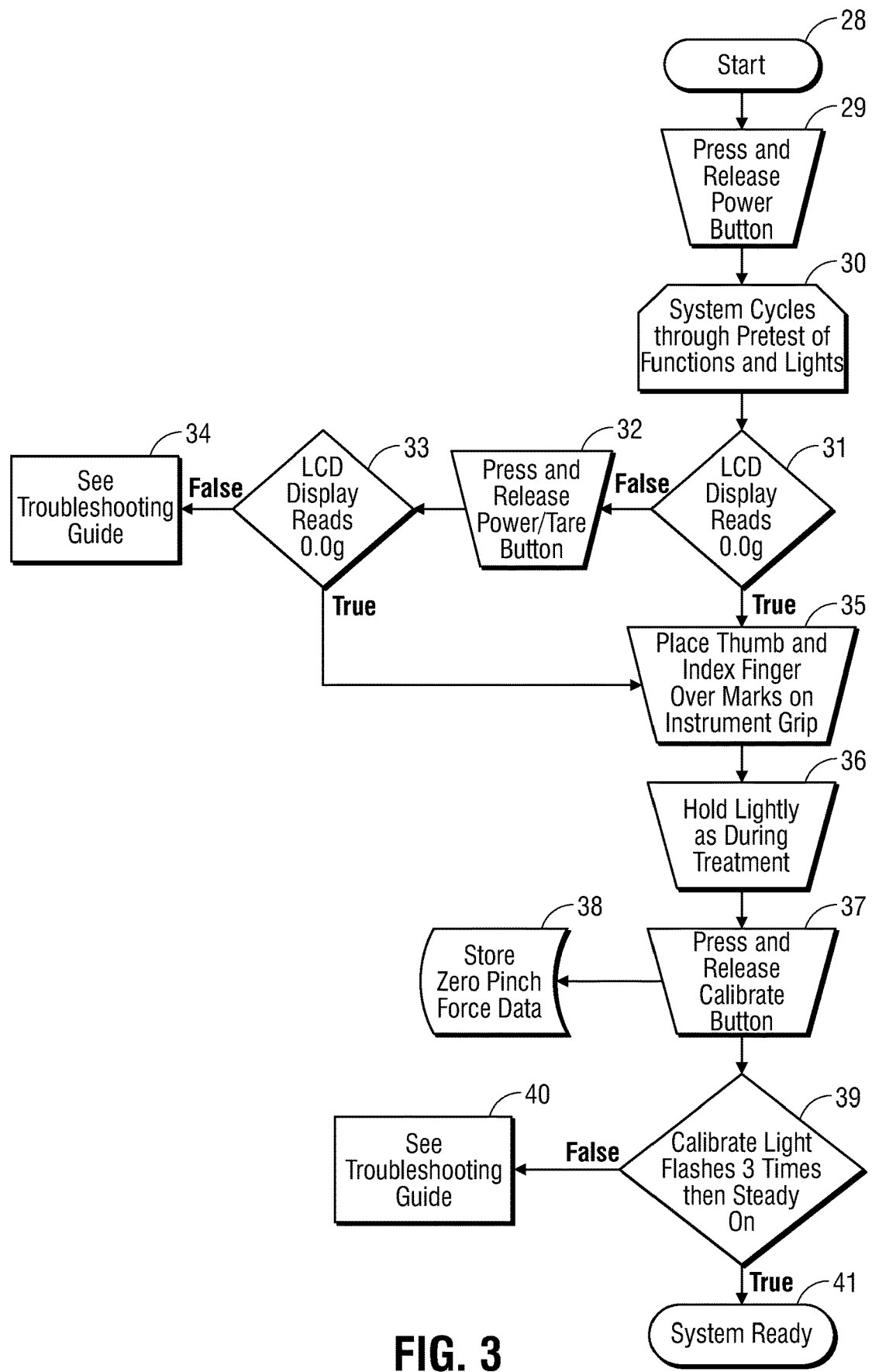
FIG. 3 is a flow diagram representation of a start up routine for a measurement system in accordance with the present disclosure.

FIG. 3 represents a flow diagram showing a simplified example for system activation which begins at start 28. With additional reference to FIG. 2B, when, at step 29, the power button 18 is pressed, the system cycles through a pretest at step 30 where functions and testing of the modules lights 14, 20 and 26 and mode activation lights 42 are tested. A decision is presented, in step 31, on the status of LCD display 20. If the status in step 31 is 000.0 grams (true), the user may grasp the instrument on the provided placement marks, for example, markers 3 (FIG. 1A), as indicated in step 35. When the status is false, the user may press the power/tare button 18, as indicated in step 32. In this case, the LCD display 19 is reset to read 000.0 grams and the process continues to step 35 where the user may grasp the instrument on the provided placement marks. If the LCD fails to reset to 000.0 grams, the method moves to step 34, where an error is returned and the user is directed to see the troubleshooting guide.

Once the user grasps the instrument at step 35, the method proceeds to step 36, wherein the user is instructed to lightly grasp the instrument, as the instrument would be grasped during use, e.g., treatment. After pressing the calibrate button 14 at this point, the method continues to step 37, wherein the system stores the values for all sensors, for example sensors 4, 5, and 6 (FIG. 1A) in a storage device associated therewith. This data may be stored as zero pinch force data, as indicated at step 38. Calibration and storing in steps 37 and 38 are verified and indicated by the module light 14, wherein the light flashes three times and reverts to a steady lighted state (true) indicating that the system is ready for use, as indicated at steps 39 and 41. If calibration and/or storage fails, rather than indicating ready for use at step 41, the method proceeds to step 40, wherein an error is returned and the user is directed to see the troubleshooting guide.

Figure 4:
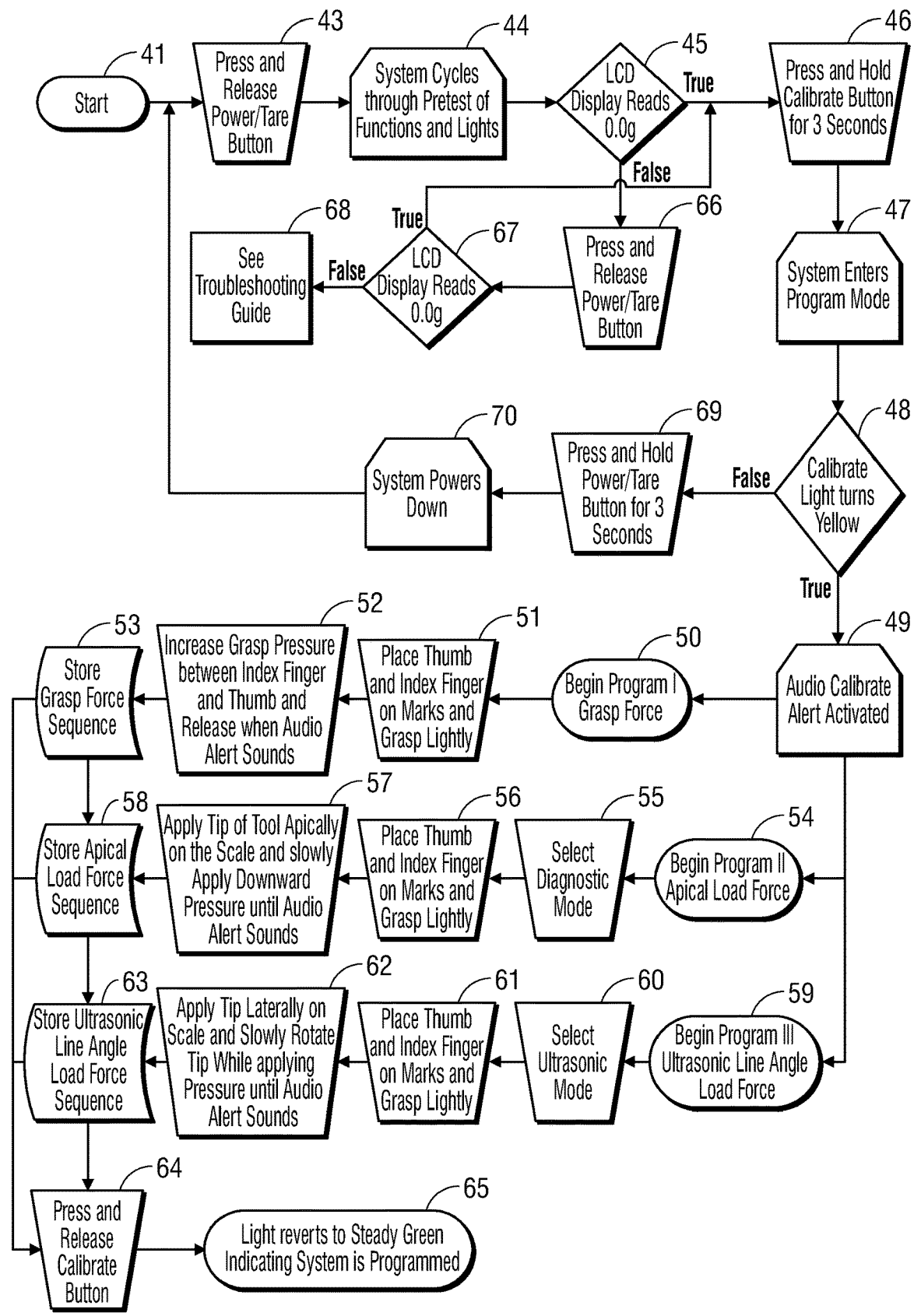
FIG. 4 is a flow diagram showing exemplary programming steps for baseline measurements and storage for grasp, apical, and ultrasonic line angle forces in accordance with the present disclosure.

FIG. 4 illustrates method in accordance with the present disclosure wherein the output of sensors embedded, mounted, or removably mounted onto instruments are generated by a controlled process of applying force against a calibrated device, for example a gram-scale, and storage of a sequence of the data under load, wherein the data can be processed to provide, for example, sensor output's representing calibrated load forces applied to or by the tip of the instrument independent of the grasp forces applied by the user on the instrument during measurement. It is understood that while the examples presented represent handheld dental tools, including scalers, explorers, probes, and ultrasonic tools, that the process applies equally to any instrument that has sensors attached. Additional or alternative sensor configurations are also contemplated.

Continuing with reference to FIG. 4, and with additional reference to FIG. 2B, a non-limiting example is presented for programming the various modes 21, 22, 23, 24, 25, wherein to avoid unnecessary complication, three programming sequences are described: grasp force, which is common to all user modes; an apical loading force mode 21, and an ultrasonic line angle force mode 23. The method begins at a ready for use or start step 41. After system power on at step 43, a system pretest is initiated at step 44 wherein a test to verify a zero LCD display 19 is performed at step 45. If a true condition, the method proceeds to activation of the programming function at step 46, which is initiated by pressing and holding the calibrate button 16 for three seconds, whereupon it will flash three times. For the case where the outcome of test at step 45 is false, the user is instructed to proceed through steps 66 and 67, which zeros the LCD display 19 similarly a detailed above and, if zeroing is not accomplished, to see the troubleshooting guide at step 68, also similarly detailed above.

Once a zeroed LCD display is confirmed and activation performed at step 46, the method proceeds to enter the programming mode at step 47 wherein such entry is tested for validity at step 48. A steady yellow light signifies a true outcome and moves the process to step 49 where an audio alert signifies a successful transition to the programming mode. In the case where the outcome of the test in step 48 is false, the user is directed to turn the system off, power down, and reboot/restart, as indicated at steps 69, 70, and 43, respectively.

With continued reference to FIG. 4, when the system enters the programming mode, no mode lights are lit, indicating the system will begin programming the instrument grasp function at step 50. The user is instructed, at step 51, to place the index finger and thumbs on the location marks indicating the preferred grasp position (see markers 3 of FIG. 1A). It is understood that the grasp forces have been zeroed and stored during the process described in FIG. 3. The grasp force programming begins with the instructions of step 52, wherein the grasp data is stored in step 53 for later retrieval and processing.

The programming for apical load force selection, predominate in the diagnostic mode (although other modes are also contemplated), is indicated by the illumination of light 42 adjacent to mode selection button 21. All mode programming processes have common steps of mode selection and lightly grasping the instrument, for example tool 1 (FIG. 1A). Thus, for the apical load programming started at step 54, the mode is selected at step 55 and grasping is indicated at step 56. Next, at step 57, the method proceeds with the user slowly applying increased apical force on scale 15 until the audio alert sounds, indicating the sensor data has been stored for later retrieval and processing, as indicated at step 58.

With further reference to FIG. 4, steps 59, 60, 61, 62, and 63 describe the programming for the ultrasonic line angle load force selection, and are similar to the steps 54, 55, 56, 57, and 58 detailed above with respect to the apical load force programming. At the conclusion of the ultrasonic line angle load force programming and/or the apical load force programming, the method proceeds to step 64, wherein the calibration button is pressed, and then the step 65, wherein an indication is provided that the system is programmed.

Referring to FIG. 5, a method wherein the grasp position is evaluated based on the position of the index finger placement in combination with the relative forces on sensors A, B, and C, e.g., sensors 4, 5, and 6 (FIG. 1A), is described. The sensors 4, 5, and 6 (FIG. 1A), more specifically, correspond to sensors A, B, and C, respectively, and are utilized interchangeably hereinbelow, although it is understood that sensors A, B, and C may be different sensors in other configurations.

After the ready for use or start step 41, the force measurements from the sensors are read at steps 71, 72, and 73. The initial grasp forces are effectively removed by the process described in FIG. 3 in steps 74, 75, and 76. The grasp creep is determined at step 82 wherein the relative forces applied to sensor 5 (FIG. 1A) is compared to a maximum force, for example 20 grams. If the force is greater than the maximum at step 82, a visual and/or audible indication is provided in step 83, signaling improper grasp. Otherwise, a proper grasp is indicated at step 86.

Continuing with reference to FIG. 5, in conjunction with FIG. 2B, wherein the grasp indications from step 82 are acceptable, the process examines various logic states in step 77 indicating the selection of the diagnostic mode. More specifically, it is determined in step 77 which mode is true (1) and, thus, which modes are false (0), wherein "D" is the diagnostic mode, "E" is the exploratory mode, "H" is the hand instrumentation mode, "U" is the ultrasonic instrumentation mode, and "I" is the implant mode (see also corresponding controls 21, 22, 23, 24, 25, respectively). In step 78, it is determined whether the pressure on sensor A is greater than the pressure on sensor C. For the diagnostic mode 21, "D"=1 in step 77, where the decision at step 78 is false, the method proceeds to step 79, wherein it is determined whether the load force is within a broad range before proceeding to steps 84, 87, and 89 wherein more specific load force ranges are considered. In the example illustrated in FIG. 5, step 87 is shown returning a "true" result and, thus, the visual output provided in step 88 is a green light indicating load forces within the desired range as established by the mode selection in step 77. No indication provided if the result of step 84 is true indicating forces are too low, as provided in step 85. A red light is illuminated indicating forces are too high if the result of step 89 is true, as indicated in step 90.

Although the above example provides scenarios for the diagnostic mode, similar method steps may be provided for the other modes, culminating in an indication (a green light, for example) of when the forces are within the desired range, an indication (a red light, for example) of when the forces are too high, and no indication when the forces are too low. For example, the broad range steps for the ultrasonic and hand instrumentation modes are shown in steps 80 and 81, respectively. Of course, the particular ranges and/or values may differ between modes.

FIG. 6 is a flow diagram based on the selection of the exploratory mode 21 (FIG. 2B), to demonstrate the determination, display, and storage of load force values independent of grasp forces. FIG. 6 begins with a system ready or start step 41, wherein the initial pinch force data has already been stored and ready for recall as detailed above with reference to FIG. 3. The user is instructed, in step 92, to place the tool tip against a load, for example a tooth structure, whereupon sensors A, B and C provide values that are read in steps 93, 94, and 95, respectively. The stored zero data determined and stored as detailed above with reference to FIG. 3 is read in step 96 and subtracted from (or otherwise utilized to correct) the sensor values in step 97 to obtain corrected sensor data valves as indicated in steps 98, 99, and 100.

In step 101, the corrected sensor A data is evaluated to determine if (corrected A)>0. It is known that at the start of the measurement process, A=0, however, the system in step 101 accounts for the possibility that the user has increased the pinch pressure after the zeroing process. In the exploratory mode (which is obtained in step 107 based on the mode determination in step 106), the predominate forces are perpendicular to Sensor C and the force on sensor A is negligible except for increased pinch force. Any increase in pinch force will be sensed equally by sensors A and C since the pinch force represents any compression between the sensors. This information is contained in the sensor output versus force data read in steps 103 and 105 (the sensor output versus force data for sensor B is also read in step 104). Because of this relationship between the forces, the sensor output data read in steps 103 and 105, any value 103 greater than the force on sensor A can be used to offset an error in load force on sensor C at step 102. The actual load force is therefore (continually) determined in step 110 and (continually) displayed in step 111 based on the dynamic loop of steps 107, 101, 108, and 109 when A=0, and the dynamic loop of steps 101, 102, 107, 109 when A>0.

Figure 7:
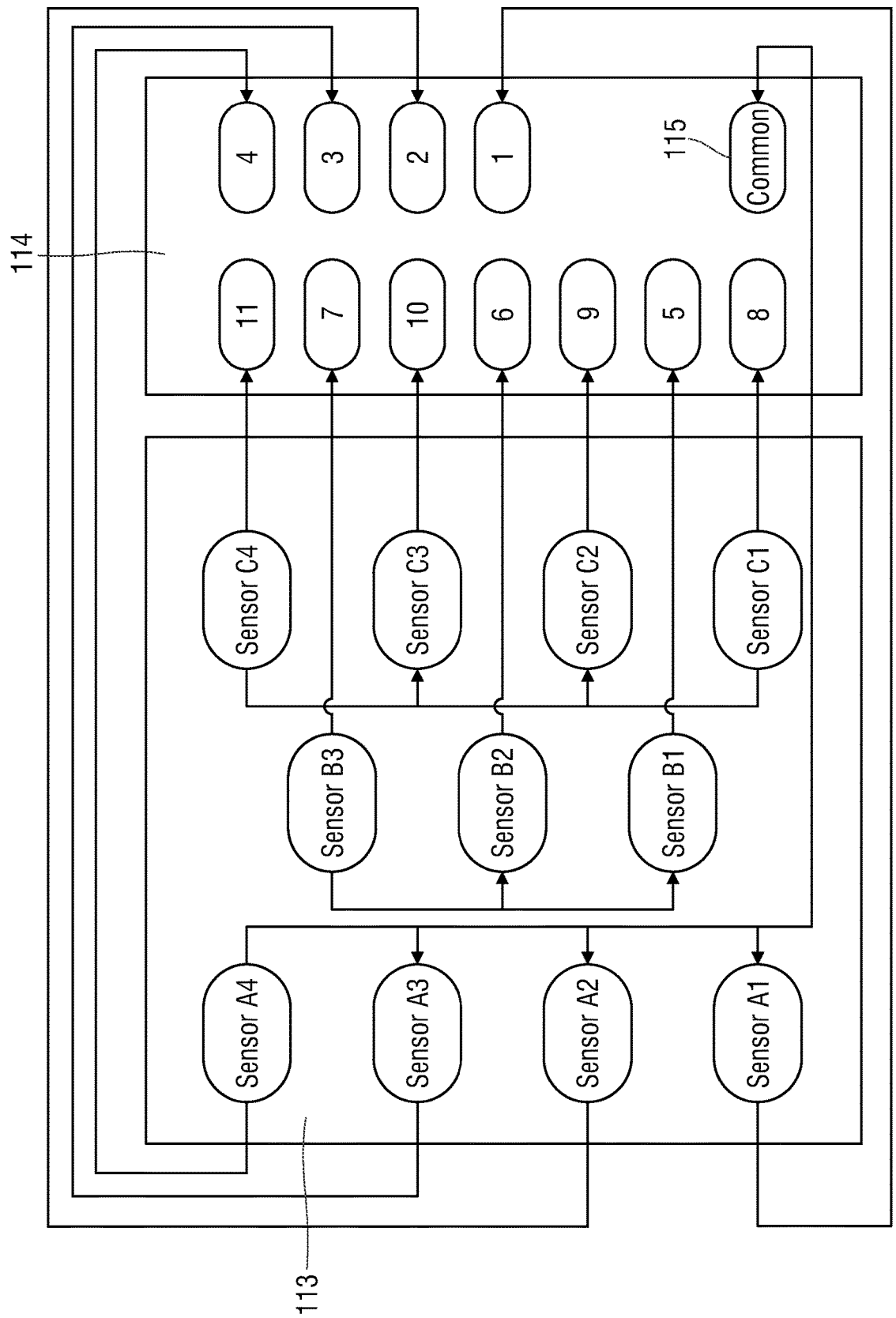
FIG. 7 is a representation of a multiple sensor array configured for a 12-pin connector in accordance with the present disclosure.

FIG. 7 is a diagram of an array of sensor transducers or other suitable sensor elements 113 with corresponding terminals 114. All elements 113 have a common lead 115. This configuration offers the advantage of being able to process the output of the individual sensors or a combination of parallel sensors so as to reduce sensitivity.

Figure 8A:
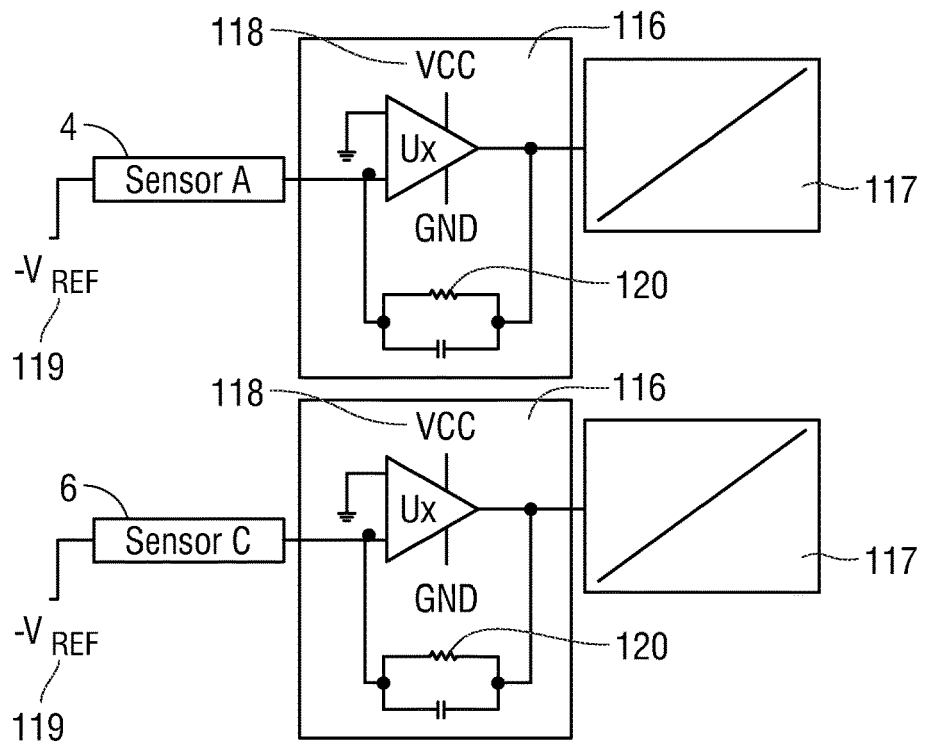
FIG. 8A is a schematic diagram showing use of an amplifier to generate a linear output for pressure applied to sensors in accordance with the present disclosure.

FIG. 8A illustrates an operational amplifier circuit 116, wherein the slopes of the sensor readings are in part determined by the ratio of the resistances of the sensors 4, 6 divided by a reference resistance 120. A typical response for the sensors 117 is a reduction in resistance with increasing force, wherein increasing the drive voltage 118 and increasing resistance 120 facilitates the measurement of lower forces. The voltage V REF 119, may comprise a square wave with a maximum value of 5V and a duty cycle of 50%.

Figure 8B:
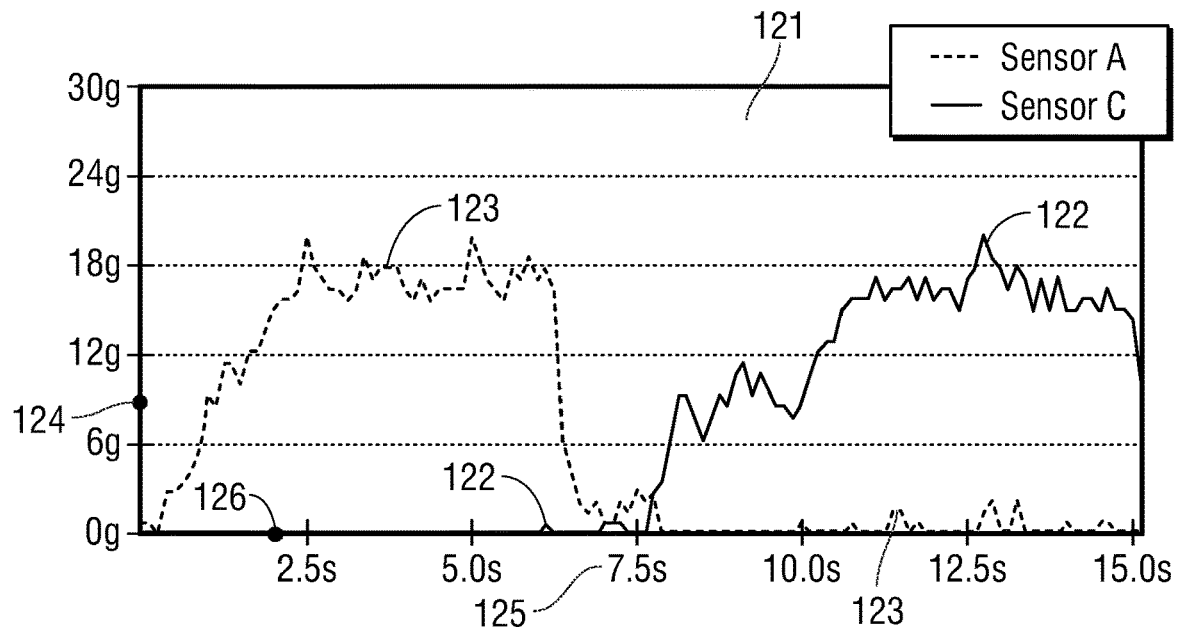
FIG. 8B is a graph illustrating pressure sensor readings as a function of time for first and second sensors.

FIG. 8B represents a response graph 121 wherein the sensors, e.g., sensors 4 and 6 (FIG. 1A) or A and C (FIGS. 5 and 6), are attached to an instrument, e.g., including tool 1 (FIG. 1A), and forces are applied to said sensors. Response curve 122 represents the output of sensor C under conditions of both apical and lateral forces, wherein the magnitude scale 124 represents a calibrated response as detailed above with reference to FIG. 6. The response curve 122 to the right or before time 125 on time scale 126 indicates application of a lateral force on tip 2, tool 1 (FIG. 1A). The response curve 122 to the left of or after time 125 on time scale 126 indicates application of an apical force applied to tip 2, tool 1 (FIG. 1A). In a similar fashion, response curve 123 represents the output of sensor A under conditions of both lateral and apical forces, wherein the magnitude scale 124 represents a calibrated response as detailed with reference to FIG. 6, wherein the response curve 123 to the left or before time 125 on time scale 126 represents an apical force applied to tip 2, tool 1 (FIG. 1A) and whereas response curve 123 to the right or after time 125 on time scale 126 represents a lateral force applied to tip 2, tool 1 (FIG. 1A).

The above-detailed methods may be implemented by the data processing unit of control box or module 17 (FIGS. 2A and 2B) and/or across other connected devices including remote servers, the cloud, etc. Further, the above-detailed methods may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

The stored instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described methods. Also, the techniques could be fully implemented in one or more circuits or logic elements. Further still, the data processing may be performed using pre-stored data processing algorithms, Artificial Intelligence (AI) programs, combinations thereof, and/or in any other suitable manner.

While several aspects of the disclosure have been shown in the drawings and/or described herein, it is not intended that the disclosure be limited thereto, as it is intended that the disclosure be as broad in scope as the art will allow and that the specification be read likewise. Therefore, the above description should not be construed as limiting, but merely as exemplifications of particular aspects. Those skilled in the art will envision other modifications within the scope of the claims appended hereto.

What is claimed is:

1. A training system, comprising:
a tool including a tip portion and grip portion, the grip portion having at least two force sensing transducers configured to measure force applied thereto to enable determination of sensor force measurement data; and
a control module connected to the tool and configured to receive the sensor force measurement data, the control module including a storage device configured to store zeroed force data, and a data processing unit including a processor and memory storing instructions that, when executed by the processor, cause the processor to:
obtain the sensor force measurement data and the zeroed force data;
determine, based upon the sensor force measurement data and the zeroed force data, a load force that is independent of grasp force;
determine whether the load force is within a set range; and
in at least one of a case where the load force is within the set range or a case where the load force is outside of the set range, provide a corresponding indication.

2. The system according to claim 1, wherein the at least two force sensing transducers includes an array of three force sensing transducers A, B, and C, wherein an angle $\alpha 1$ is defined between longitudinal centerlines of transducers A and C, and wherein an angle $\alpha 2$ is defined between the longitudinal centerline of transducer A and a plane defined by the tip portion of the tool.

3. The system according to claim 2, wherein $\alpha 1$ and $\alpha 2$ are each 120 degrees.

4. The system according to claim 2, wherein $\alpha 1$ is 180 degrees and $\alpha 2$ is 90 degrees.

5. The system according to claim 2, where markings are located on the centerlines of transducers A and C to facilitate proper grasp placement on the tool.

6. The system according to claim 1, wherein the indication is at least one of an audio indication or a visual indication.

7. The system according to claim 1, wherein the control module further includes at least one input configured to enable user-selection of a mode of use.

8. The system according to claim 7, wherein the set range is determined based upon the mode of use selected.

9. The system according to claim 1, wherein determining the load force independent of the grasp force includes subtracting the zeroed force measurement data from the sensor force measurement data for at least one force sensing transducer of the at least two force sensing transducers.

10. The system according to claim 1, wherein the processor of the control module is further caused to obtain, during a measurement, the zeroed force measurement data.

11. The system according to claim 10, further comprising a scale configured to receive the tip portion of the tool, the scale configured to enable determination of scale force measurement data by measuring a force applied to the scale by the tip portion of the tool, wherein the scale force measurement data is stored in the storage device of the data processing unit for utilization during the measurement.

12. The system according to claim 1, wherein the processor is further caused to:
determine, based upon the sensor force measurement data, whether the tool is properly grasped or improperly grasped; and
provide an indication when at least one of: it is determined that the tool is properly grasped or it is determined that the tool is improperly grasped.

13. A training system, comprising:
a tool including a tip portion and grip portion, the grip portion having at least two force sensing transducers configured to measure force applied thereto to enable determination of sensor force measurement data; and
a control module, including:
a scale configured to receive the tip portion of the tool, the scale configured to measure a force applied to the scale by the tip portion of the tool to enable determination of scale force measurement data;
at least one input device configured to enable user-selection of a mode of use; and
a data processing unit including a processor and memory storing instructions that, when executed by the processor, cause the processor to:
determine, based upon the scale force measurement data, calibration data;
store the calibration data in a storage device;
store, as mode data, the mode of use selected;
obtain the sensor force measurement data;
retrieve the calibration data;
determine, based upon the sensor force measurement data and the calibration data, a load force that is independent of grasp force;
retrieve the mode data; and
determine whether the load force is acceptable or not acceptable utilizing criteria based on the mode data retrieved.

14. The system according to claim 13, wherein the at least two force sensing transducers includes an array of three force sensing transducers A, B, and C, wherein an angle $\alpha 1$ is defined between longitudinal centerlines of transducers A and C, and wherein an angle $\alpha 2$ is defined between the longitudinal centerline of transducer A and a plane defined by the tip portion of the tool.

15. The system according to claim 14, wherein $\alpha 1$ and $\alpha 2$ are each 120 degrees.

16. The system according to claim 14, wherein $\alpha 1$ is 180 degrees and $\alpha 2$ is 90 degrees.

17. The system according to claim 14, where markings are located on the centerlines of transducers A and C to facilitate proper grasp placement on the tool.

18. The system according to claim 13, wherein the processor is further caused to provide at least one of an audio indication or a visual indication in response to at least one of determining that the load force is acceptable or determining that the load force is not acceptable.

19. The system according to claim 13, wherein the criteria includes an acceptable range, the acceptable range determined based upon the mode data.

20. The system according to claim 13, wherein determining the load force independent of the grasp force includes subtracting the calibration data from the sensor force measurement data for at least one force sensing transducer of the at least two force sensing transducers.

21. The system according to claim 13, wherein the processor is further caused to:
determine, based upon the sensor force measurement data, whether the tool is properly grasped or improperly grasped; and
provide an indication when at least one of: it is determined that the tool is properly grasped or it is determined that the tool is improperly grasped.

22. A training system, comprising:
- a tool including a tip portion and grip portion, the grip portion having a plurality of force sensors configured to measure forces applied thereto and output first force data based upon the measured forces;
- a scale configured to receive the tip portion of the tool, the scale configured to measure forces applied thereto and to output second force data based upon the measured forces;
- at least one input device configured to enable user-selection of a mode of use and to output mode data based upon the selected mode of use; and
- a data processing unit including a processor and memory storing instructions that, when executed by the processor, cause the processor to:
  - receive the first force data, the second force data, and the mode data;
  - determine, based upon the first and second force data, a load force that is independent of grasp force; and
  - determine whether the load force is acceptable or not acceptable utilizing criteria based on the mode data.

23. The training system according to claim 22, wherein at least the data processing unit is incorporated into a simulation system.

24. The training system according to claim 23, wherein the at least one input device is also incorporated into the simulation system.

25. The training system according to claim 23, wherein the tool and the scale are connectable to the simulation system.

* * * * *